Aug. 11, 1959 H. E. RAGAN 2,898,804
PROJECTING ARRANGEMENT
Filed Jan. 4, 1957
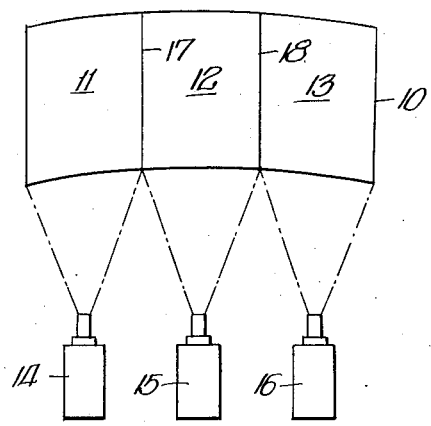
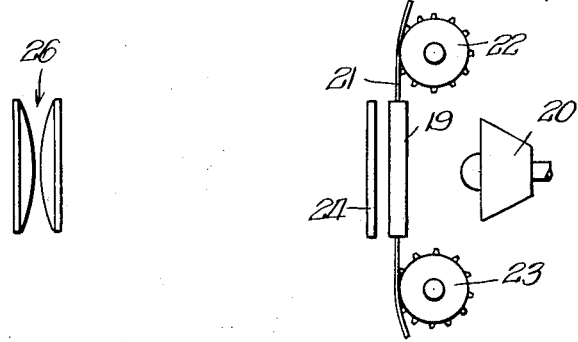
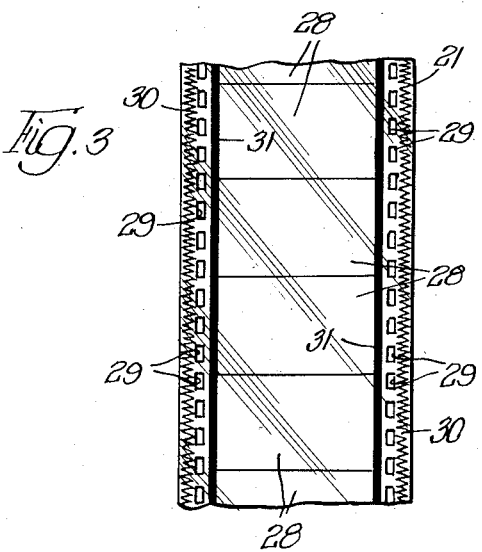
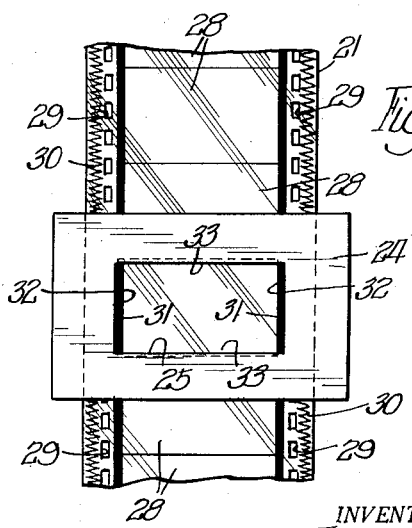
INVENTOR.
Harry E. Ragan,
BY
Cromwell, Greist + Warden
Attys

United States Patent Office 2,898,804
Patented Aug. 11, 1959

2,898,804

PROJECTING ARRANGEMENT

Harry E. Ragan, Chicago, Ill.

Application January 4, 1957, Serial No. 632,575

1 Claim. (Cl. 88—16.6)

The present invention is directed to a new and improved form of projecting arrangement whereby the vertical side edges of an image projected onto a viewing screen are sharply defined. More specifically, the present invention deals with an improvement in projecting arrangements for use in panoramic viewing wherein a plurality of separately projected images are longitudinally aligned in side-by-side, edge-abutting relation on a viewing screen to provide a continuous uninterrupted scene, each of the edge-abutting vertical margins of the projected images being sharply defined and in focus to allow critical alignment of the separate images without loss of continuity in the vertical seam portions thereof.

The combining of a plurality of images in vertical side-by-side, edge-abutting relation to provide a continuous scene creating at least a partial illusion of depth perception has found considerable acceptance in the motion picture industry. Projection methods of this type such as "Cinerama" utilize wide screen viewing, each segment of the continuous view having been taken from a slightly different angle by a separate camera. The combining of a plurality of separate images, usually appearing in the form of three images, has generally been considered a major advancement in the motion picture industry.

In multiple image viewing, a separate projetcor is used to project each separate image onto a single screen and, as is well known, the adjacent vertical edge margins of each image are moved into contacting relation with one another so as to provide a continuous, substantially uninterrupted single scene. Each projector includes basically a frame through which the film strip carrying successive images is advanced by motor driven sprocket means. Immediately in front of the frame is an aperture which is in the form of a frame-like member, the central portion of which is opened to define the aperture through which the successive images of the film are projected by a suitable light source. Spaced forwardly from the aperture is a focusing lens system used to bring the projected image into focus on the viewing screen which is normally placed a considerable distance from the focusing lens system. The film itself is light transmissive in its entirety and the side margins outwardly of the vertical side edges of the successive images are provided with sprocket receiving apertures and magnetic sound tracks. The aperture functions, in effect, to expose that portion of the film carrying the images to the lens system for projection onto the viewing screen. It is preferred, of course, not to project any other portion of the film other than the successive images and, consequently, the dimensions of the aperture are such that each image frame is covered slightly inwardly of its margins so that the entirety of each image is not projected through the aperture or exposed to the lens system.

With this general arrangement the edges of the aperture are projected as a result of light transmitted through the film contacting the same and being reflected thereby. This reflected light is picked up by the lens system and projected onto the viewing screen along with the light transmitted through the image. The aperture being positioned in front of the film intermediate the same and the lens system is not in focus as the lens system is adjusted to focus the image of the film. Consequently, the projected, in-focus image viewed on the screen is provided with blurred margins which are actually the projection of the edges defining the aperture which are out of focus.

In single image projection this undesirable result can be compensated for by masking the edge margins of the viewing screen to an extent that the out-of-focus margins of the projected image are not viewed. However, where two or more images are projected onto a single screen in edge-abutting relation, the adjacent margins defining the junction or seam between the images are blurred and the continuity of the scene is interrupted. This disadvantage has been considered material in connection with wide screen projection of the "Cinerama" type wherein three images are projected onto the screen, the vertical side margins of the center image being joined with the adjacent vertical side margins of the two side images. The two vertical seams thus formed are blurred areas of sufficient width to be readily noticeable by the audience and disruptive of the continuity of the scene under observance. Efforts have been made to overcome this undesirable aspect of multiple image projection but at the present time no fully acceptable solution has been devised.

It is an object of the present invention to provide a new and improved projecting arrangement whereby marginal edges of projected images are maintained in focus to define sharp and distinct edges which can be readily placed in close contacting relation with an edge of an adjacent image to provide a continuous uninterrupted, fully focused scene.

A further object is to provide a projecting arrangement wherein a plurality of separately projected images can be horizontally aligned on a single viewing screen in edge-abutting relation with the vertical seams defined by the contacting edges of adjacent images being sharply in focus, the projecting arrangement including the use of an improved form of film strip having opaque areas which prevent the out-of-focus projection of the peripheral aperture edge of the projecting device.

Other objects not specifically set forth will become apparent from the following detailed description made in conjunction with the drawings wherein:

Fig. 1 is a schematic representation of multiple image projection;

Fig. 2 is a schematic representation of the improved projecting arrangement of the present invention;

Fig. 3 is a fragmentary plan view of an improved form of film strip for use in the projecting arrangement of the present invention; and Fig. 4 is a fragmentary view of the combined improved film strip and projector aperture of the present invention illustrating the combined functioning of the same.

In Fig. 1 a typical multiple image projection arrangement is illustrated wherein a curved viewing screen 10 has projected thereon three separate images 11, 12 and 13 by separate projecting devices 14, 15 and 16 respectively. Adjacent vertical side margins of the images 11 and 12 are brought into abutting relation to define a vertical seam or junction 17 while the adjacent vertical side margins of the images 12 and 13 combine to define a vertical seam 18. It is the seams 17 and 18 which the present invention improves to an extent that complete blending of the adjacent images occurs so as to alleviate blurred areas capable of adversely affecting scene continuity and audience appreciation.

In Fig. 2 a typical projecting arrangement is schematically illustrated wherein a film strip frame 19 is positioned in front of a light source 20 and has received therethrough a film strip 21 continuously advanced by motor driven sprockets 22 and 23. In front of the frame 19 is positioned a projecting aperture means 24 which is generally of rectangular outline as shown in Fig. 4 and is provided with a central rectangular opening 25. Spaced at a distance in front of the aperture 24 and aligned with the aperture, frame and light source is a focusing lens system generally designated by the numeral 26. In line with conventional operation of a projector, light from the light source 20 is transmitted through the images of the film 21 passing through the frame 19 and the image is projected through the aperture 24 and lens system 26 outwardly onto the viewing screen 10.

In the projecting arrangement of the present invention, the film strip 21 as viewed in Figs. 3 and 4 is conventional in substantially every respect in that it is provided with successive frames or images 28 confined between sprocket receiving apertures 29. Inwardly of each of the side margins of the strip 21 is a magnetic sound track 30 which cooperates with sound equipment of a known type forming a part of the projector to coordinate the sound with the image sequence of the film. The entire film strip 21 is generally transparent as is well known and the function of the aperture 24 is to confine the portion of the film projected to the image portion 28. Consequently, in conventional types of projecting devices the projecting aperture 25 has lesser dimensions than the successive images 28 projected through the same. In this manner marginal areas to the sides of the successive images 28 are not projected onto the screen 10 and each individual image is separately projected as it passes into register with the opening 25. The vertical dimension of the opening 25 is less than the vertical dimension of each image 28 as shown in Fig. 4 in order to avoid projection of portions of adjacent images when a single aligned image is being viewed. However, as previously described with this conventional arrangement, the peripheral edges of the opening 25 are projected onto the screen 10 and blurred margins result.

In order to avoid the projection of the peripheral edges of the opening 25, the film strip 21 is provided with continuous vertical opaque stripes 31 arranged in abutting relation with the vertical edges of the successive images 28. The opaque stripes 31 are readily formed on the film strip 21 during the developing process and, as a result, are in the same focal plane as the successive images 28. The dimensions of the aperture opening 25 are such that the width is slightly greater than the width of each image 28 so that the vertical side margins 32 overlap the marginal portions of the stripes 31 immediately adjacent the vertical side edges of the images 28. This arrangement is shown in Fig. 4 and for purposes of illustration the dimensions described have been exaggerated, it being understood that it is merely necessary to expose a small portion of each of the stripes 31 of hairline extent to the lens system 26. The vertical dimension of the aperture opening 25 preferably remains the same so that the horizontal edges 33 of the opening 25 overlap the top and bottom margins of each of the images 28. In this manner only one image 28 is viewed at a time.

With the presence of the opaque stripes 31 and their combined functioning with the aperture 24, light from the light source 20 is prevented from contacting the vertical edges 32 of the aperture opening 25. Consequently, the lens system 26 does not pick up reflected light from these vertical edges and each image projected is defined by thin line vertical side edges. These thin line side edges are in focus as the lens system is adjusted to focus the images 28 and the stripes 31 are in the same focal plane as these images. With the sharp line focusing of the innermost edges of the stripes 31, each of the separate images 11, 12 and 13 may be brought into side-by-side, edge-abutting relation with the contacting margins thereof defining vertical seams 17 and 18 which are unobservable by the audience at least to an extent that the continuity of the over-all scene is uninterrupted or uninterfered with in any respect.

The top and bottom margins of the cooperating images 11, 12 and 13 will be out of focus due to the projecting of the top and bottom edges 33 of the aperture or opening 25 of each of the projecting devices. However, in line with recognized practices these out-of-focus marginal portions can be eliminated by suitable masking of the screen 10. Likewise, the free vertical edges of the endmost images, namely, 11 and 13, can also be masked at the plane of the screen 10 if it is desired to utilize film strips in the projectors 14 and 16 which are provided with only one opaque stripe 31 contiguous to the vertical margin brought into edge-abutting relation with the center image 12. However, for purposes of standardization and with no increase in processing costs, it will generally be preferable to provide each film strip 21 with the two transversely spaced stripes 31 although in connection with the endmost film strips only one opaque stripe is necessary in order to obtain the advantageous results of the present invention.

Obviously many modifications and variations of the invention as hereinbefore set forth may be made without departing from the spirit and scope thereof, and therefore only such limitations should be imposed as are indicated in the appended claim.

I claim:

In a multiple image projection arrangement wherein a plurality of film images are separately projected by projecting devices onto a single viewing screen in side-by-side edge-abutting relation on said screen, the improvement in each of said projecting devices of providing a film strip of successive light transmissive images having their vertical edges sharply defined by completely opaque stripes which are of substantial width, each film strip being advancedly mounted in close association with a projection aperture means which defines an aperture exposing each successive image in its entirety and the innermost edge margins of said stripes to a focusing lens system carried forwardly thereof, whereby when projected the exposed innermost edges of the stripes of each of the film strips of each projecting device are in focus on said viewing screen and provide line contact with adjacent edges of the strips of adjacent projected images to produce a continuous uninterrupted sharply defined scene.

References Cited in the file of this patent

UNITED STATES PATENTS

| | | |
|---|---|---|
| 1,130,702 | Bjerregaard | Mar. 9, 1915 |
| 1,349,580 | Paradis | Jan. 13, 1930 |
| 2,280,206 | Waller et al. | Apr. 21, 1942 |
| 2,334,962 | Seitz | Nov. 23, 1943 |

FOREIGN PATENTS

| | | |
|---|---|---|
| 23,396 | Great Britain | of 1907 |
| 298,615 | Great Britain | Jan. 13, 1930 |
| 2,703 | Australia | June 22, 1931 |